(12) United States Patent
Hiraoka et al.

(10) Patent No.: US 9,343,188 B2
(45) Date of Patent: May 17, 2016

(54) CONTROL ROD FOR HIGH TEMPERATURE GAS REACTOR

(75) Inventors: Toshiharu Hiraoka, Mitoyo (JP);
Takashi Konishi, Mitoyo (JP);
Masatoshi Yamaji, Mitoyo (JP);
Hiroshi Machino, Mitoyo (JP); Taiju Shibata, Higashi-ibaraki-gun (JP);
Kazuhiro Sawa, Higashi-ibaraki-gun (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 631 days.

(21) Appl. No.: 13/395,925

(22) PCT Filed: Sep. 13, 2010

(86) PCT No.: PCT/JP2010/065696
§ 371 (c)(1),
(2), (4) Date: May 2, 2012

(87) PCT Pub. No.: WO2011/030886
PCT Pub. Date: Mar. 17, 2011

(65) Prior Publication Data
US 2012/0207263 A1    Aug. 16, 2012

(30) Foreign Application Priority Data

Sep. 14, 2009 (JP) ................. 2009-212474

(51) Int. Cl.
*G21C 7/10* (2006.01)
*G21C 7/113* (2006.01)
(Continued)

(52) U.S. Cl.
CPC ........ *G21C 7/10* (2013.01); *G21C 7/107* (2013.01); *G21C 1/07* (2013.01); *G21C 7/24* (2013.01); *Y02E 30/33* (2013.01); *Y02E 30/39* (2013.01)

(58) Field of Classification Search
None
See application file for complete search history.

(56) References Cited

U.S. PATENT DOCUMENTS

| 4,001,078 A | 1/1977 | Doll |
| 5,075,072 A | 12/1991 | Vollman |
| 6,246,740 B1 | 6/2001 | Maruyama et al. |

FOREIGN PATENT DOCUMENTS

| CN | 2209668 Y | 10/1995 |
| DE | 2925863 A1 | 1/1981 |

(Continued)

OTHER PUBLICATIONS

Kazakhstan Office Action dated Nov. 12, 2013, issued in corresponding Kazakhstan Patent Application No. 2012/1539.1, w/English translation, (4 pages).

(Continued)

*Primary Examiner* — Jack W Keith
*Assistant Examiner* — Sean P Burke
(74) *Attorney, Agent, or Firm* — Westerman, Hattori, Daniels & Adrian, LLP

(57) ABSTRACT

A high-temperature gas reactor control rod is provided that does not degrade the joining state between the control rod elements even when stress is applied thereto, and that can improve the safety of the high temperature gas reactor remarkably by improving the heat resistance thereof.
The high-temperature gas reactor control rod has a plurality of control rod elements (1) each having a neutron absorber (7) between an outer cylinder (9) and an inner cylinder (8) that form a double cylindrical tubular shape, the control rod elements (1) joined to each other in a vertical direction, characterized by: a columnar support member (2) for supporting at least the neutron absorber (7), disposed in the inner cylinder (8); and joining means for joining to another control rod element (1), provided at least one of upper and lower ends of the support member (2).

16 Claims, 15 Drawing Sheets

(51) Int. Cl.
*G21C 7/107* (2006.01)
*G21C 7/24* (2006.01)
*G21C 1/07* (2006.01)

(56) References Cited

FOREIGN PATENT DOCUMENTS

| JP | 36-20333 | B1 | 10/1961 |
|---|---|---|---|
| JP | 51-51697 | A | 5/1976 |
| JP | 51-113093 | A | 10/1976 |
| JP | 53-139083 | A | 12/1978 |
| JP | 60-263892 | A | 12/1985 |
| JP | 61-207992 | A | 9/1986 |
| JP | 3-134592 | A | 6/1991 |
| JP | 6-148372 | A | 5/1994 |
| JP | 8-233969 | A | 9/1996 |
| JP | 2003-201196 | A | 7/2003 |
| KZ | 2069019 | C1 | 11/1996 |
| SU | 1828709 | A3 | 5/1995 |

OTHER PUBLICATIONS

International Search Report of PCT/JP2010/065696, mailing date of Oct. 5, 2010.
Chinese Office Action dated Feb. 20, 2014, issued in corresponding Chinese Patent Application No. 201080040455.6, w/English translation (21 pages).
Japanese Office Action dated Oct. 24, 2012, issued in corresponding Japanese Patent Application No. 2009-212474, with English translation (5 pages).
Extended European Search Report dated May 21, 2014, issued in corresponding European Patent Application No. 10815476.6 (7 pages).
Windes et al., "Structural Ceramic Composites for Nuclear Applications", Idaho National Laboratory, INL/EXT-05-00652, Retrieved from the Internet: URL: http://www.osti.gov/servlets/purl/911881-lapI0L, [retrieved on May 13, 2014]. cited in Extended European Search Report dated May 21, 2014.
Whenyuan, Chen et al. "Optimization Design of Box-Section Steel Columns Based on the Local Stability Provisions," Architectural Configuration, vol. 35, 6th period, Jun. 30, 2005. (2 pages).
Chinese Office Action dated Nov. 27, 2014, issued in Chinese Application No. 201080040455.6; w/English translation. (28 pages).

CONTROL ROD FOR HIGH TEMPERATURE GAS REACTOR

TECHNICAL FIELD

The present invention relates to a high-temperature gas reactor control rod, which is used for high temperature gas reactors in nuclear electric power generation.

BACKGROUND ART

The high-temperature gas reactor control rod, which is used for high temperature gas reactors in nuclear electric power generation, has a structure in which a plurality of control rod elements are joined to each other in a vertical direction (up/down direction). Each of the control rod elements accommodates a neutron absorber such as $B_4C$.

Conventionally, a metal-based high-temperature gas reactor control rod has been used for the control rod element serving as a means to accommodate a neutron absorber in a high temperature gas reactor. However, in the case of a large-scale high temperature gas reactor, in which the reactor core output power and the output power density are large and the temperature conditions are harsh, the control rod element made of a metallic material may cause the metal to melt, making it impossible to use the control rod repeatedly. This has been a technical problem. For this reason, in a large-scale high temperature gas reactor, a high-temperature gas reactor control rod made of C/C composite and a control rod element made of SiC/SiC composite, which can be used repeatedly, may be used as a control rod material that is an alternative to the metallic material.

Here, a known elevating and lowering mechanism for the high-temperature gas reactor control rod that is driven by a control rod drive apparatus has the following mechanism. A wire fixed to and integral with the control rod element is inserted through the interior of the inner cylinder of each of the control rod elements. By moving the wire upward and downward, the high-temperature gas reactor control rod is elevated and lowered. In view of such circumstances, a mechanism has also been proposed, in which a screw thread or an engaging portion is provided at a lower portion of an outer cylinder and an inner cylinder of each of control rod elements to connect the control rod element to each other (see Patent Document 1 below). Such a mechanism can somewhat inhibit the high-temperature gas reactor control rod from swaying. However, with the screw thread joining, stress such as tensile, bending, and shearing stress concentrates on the screw thread. For this reason, hanging load cannot be made large (in other words, the number of control rod elements joined is limited). Moreover, the thread may break with, for example, small shaking.

In view of this, a control rod having the following structure has also been proposed (see Patent Document 2 below). B4C powder is filled between the outer cylinder and the inner cylinder that use C/C composite and sintered. Connecting belts made of C/C are disposed in the outer cylinder of the control rod element, and the connecting belts are joined using a cruciform cross joint. The connecting belts adjacent to each other along the up/down direction are disposed so as to be twisted 90 degrees.

CITATION LIST

Patent Literature

[Patent Document 1] Japanese Unexamined Patent Publication No. H03 (1991)-134592

[Patent Document 2] Japanese Unexamined Patent Publication No. H06 (1994)-148372

SUMMARY OF INVENTION

Technical Problem

However, the prior art invention has a configuration in which the cruciform cross joints provided for the control rod elements are joined by the connecting belts. Therefore, the entire weight of the control rod needs to be supported by the long connecting belts, so it is problematic in terms of strength. If the diameter of the cruciform cross joint is made larger to improve the strength of the cross joint, the width of the connecting belt needs to be made smaller correspondingly, so the strength of the connecting belt degrades. On the other hand, if the width of the connecting belt is made larger to improve the strength of the connecting belt, the diameter of the cruciform cross joint needs to be made smaller correspondingly, so the strength of the cross joint degrades. Therefore, it is difficult to improve the strength of the high-temperature gas reactor control rod as a whole.

Accordingly, it is an object of the present invention to provide a high-temperature gas reactor control rod that does not degrade the joining state between the control rod elements even when stress such as tensile, bending, and shearing stress is applied thereto, by constructing a high strength support structure, and that can improve the safety of the high temperature gas reactor remarkably by improving the heat resistance thereof.

Solution to Problem

In order to accomplish the foregoing object, the present invention provides a high-temperature gas reactor control rod comprising a plurality of control rod elements each having a neutron absorber between an outer cylinder and an inner cylinder that form a double cylindrical tubular shape, the control rod elements joined to each other in a vertical direction, the high-temperature gas reactor control rod characterized by comprising: a columnar support member for supporting at least the neutron absorber, the columnar support member disposed in the inner cylinder; and joining means for joining another control rod element, the joining means provided at least one of upper and lower ends of the support member.

When the support member for supporting the neutron absorber is disposed in the inner cylinder as in the above-described structure, the weight of the neutron absorber is received by the support member; however, because the support member is in a columnar shape, the strength is higher than the joining belt. Therefore, even when stress such as tensile, bending, and shearing stress is applied, the joining state between the control rod elements is not impaired. As a result, the control rod main unit is not damaged at the time of emergency insertion to the nuclear reactor core and the output power adjustment, and the restart of the nuclear reactor thereafter can be done without any trouble. Moreover, since the joining means for joining another control rod element is provided at at least one of the upper and lower ends of the support member, joining of the control rod elements to each other can be accomplished smoothly. Thus, a high-temperature gas reactor control rod can be manufactured in a simple and easy manner while the safety is improved.

It is desirable that, of the members that constitute the control rod element, the member/members other than the neutron absorber be made of a C/C composite material or a SiC/SiC composite material.

When the member/members other than the neutron absorber is/are made of a C/C composite material or a SiC/SiC composite material, which has high shear strength and good heat resistance, the heat resistance can be increased and the mechanical strength can be improved. In particular, the SiC/SiC composite material has high strength, higher shear strength, and moreover excellent neutron damage resistance. For this reason, when this material is used, the above-described advantageous effects can be exhibited more significantly. Nevertheless, it is preferable that the SiC/SiC composite material be used only for the components that require strength and the like, as will be described later, because the SiC/SiC composite material is more costly than the C/C composite material. Moreover, when the member/members other than the neutron absorber is/are made of the above-mentioned material, it is possible to use the control rod repeatedly in an inert atmosphere at 2000° C., and there is no constraint on the operating conditions of the nuclear reactor because of the use temperature limit of the control rod.

It is desirable that the support member have a side wall and a hollow portion surrounded by the side wall and extending in a vertical direction.

When the support member has the hollow portion extending in a vertical direction, the weight of the support member can be reduced, so the weight received by the joining means can be accordingly reduced. This inhibits the high-temperature gas reactor control rod from damage. Therefore, the safety can be improved further. Moreover, the amount of the required raw material is less, so the cost of the high-temperature gas reactor control rod can be reduced. In addition, since the side wall exists around the hollow portion, the strength of the support member can be inhibited from degrading.

It is desirable that the joining means have a shaft horizontally inserted through two holes formed in the side wall of the support member, and a ring-shaped joining belt through which the shaft passes.

Thus, the control rod elements can be joined to each other merely by providing the shaft horizontally inserted through the two holes formed in the side wall of the support member and the ring-shaped joining belt through which the shaft passes. Therefore, it becomes possible to join the control rod elements to each other easily at low cost.

It is desirable that the joining belt have a plate shape.

Although the shape of the joining belt is not limited to a plate shape, it is possible to provide a joining belt that is lightweight and has improved strength when the joining belt has a plate shape. Moreover, the resistance to torsional stress can also be increased.

It is desirable that a gap be provided between the control rod elements.

When a gas is provided between the control rod elements, the shaft can move upward and downward within the joining belt. Therefore, even when stress is applied to the control rod element in an axial direction (in a vertical direction), the control rod elements can be prevented from damage.

When the joining means are provided respectively at both upper and lower ends of the support member, it is desirable that the shaft provided at the upper end and the shaft provided at the lower end be disposed so as to be in a twisted state, and that the width of the joining belt be configured to be smaller than the axial length of the shaft in the hollow portion.

When the width of the joining belt be configured to be smaller than the axial length of the shaft in the hollow portion, the joining belt can move along an extending direction of the shaft within the hollow portion. Moreover, when the shaft provided at the upper end and the shaft provided at the lower end are disposed in a twisted state, the joining belt provided at the upper end and the joining belt provided at the lower end can move in different directions. Therefore, the shaft and the joining belt can be prevented from damage even when stress is applied thereto from any direction as long as the direction is a direction perpendicular to the axis of the control rod element (i.e., a horizontal direction).

It is desirable that the diameter of the shaft be smaller than the diameter of the two holes formed in the side wall.

When the diameter of the shaft is smaller than the diameter of the two holes formed in the side wall (in other words, when the shaft is inserted through the holes with a slight clearance), stress can be alleviated in a similar manner to the above.

It is desirable that an internal hollow portion width of the joining belt along a direction perpendicular to the axis of the shaft be larger than the diameter of the shaft.

When the internal hollow portion width of the joining belt along a direction perpendicular to the axis of the shaft is larger than the diameter of the shaft, the shaft can slightly rotate in a horizontal direction within the joining belt. Therefore, the joining belt and the shaft can be prevented from damage even when stress is applied thereto in a bending direction (in a twist direction).

It is desirable that the shaft be disposed at a position near the lower end of the side wall of the support member in a control rod element positioned upward of the adjacent control rod elements among the plurality of control rod elements, and the shaft be disposed at a position near the upper end of the side wall of the support member in a control rod element positioned downward thereof.

The length of the joining belt can be kept small when the shaft is disposed at a position near the lower end of the side wall of the support member in the control rod element positioned upward while the shaft is disposed at a position near the upper end of the side wall of the support member in the control rod element positioned downward. As a result, the size of the joining belt can be reduced. Moreover, it is possible to prevent unnecessary swaying of the control rod.

It is desirable that the shaft be kept in a condition such as to be inserted through the two holes even when one end of the shaft is in contact with an inner surface of the inner cylinder.

As long as the shaft is kept in a condition such as to be inserted through the two holes even when one end of the shaft is in contact with an inner surface of the inner cylinder, the control rod elements can be prevented from falling, which results from disengagement of the shaft.

It is desirable that a neutron absorber supporting flange extending toward the inner cylinder be formed at the lower end of the support member or in the vicinity thereof.

When the neutron absorber supporting flange extending toward the inner cylinder is formed at the lower end of the support member or in the vicinity thereof, the neutron absorber can be supported from below. Thus, the neutron absorber can be supported easily.

It is desirable that the support member have a polygonal cross-sectional shape, and that the polygon be an even number polygon.

When the cross-sectional shape of the support member is in an even number polygonal shape, the shaft can be disposed between the side walls opposite to each other, so the support member can be manufactured easily.

It is desirable that the support member in the polygonal cross-sectional shape be formed by combining flat plate-shaped parts made of a carbonaceous material with each other.

When the support member in the polygonal cross-sectional shape is formed by combining flat plate-shaped parts made of a carbonaceous material with each other, the components that constitute the support member can be manufactured easily, and as a result, the manufacturing cost of the high-temperature gas reactor control rod is lowered.

It is desirable that the neutron absorber supporting flange be integrally formed with the flat plate-shaped part made of a carbonaceous material.

When the neutron absorber supporting flange is integrally formed with the flat plate-shaped part made of a carbonaceous material, the load of the neutron absorber is applied in a plane direction of the flat plate-shaped part made of a carbonaceous material, so the load of the neutron absorber is dispersed. As a result, the control rod elements can be prevented from damage, and the safety is improved further.

Advantageous Effects of Invention

The present invention achieves significant advantageous effects of not degrading the joining state between the control rod elements even when stress such as tensile, bending, and shearing stress is applied thereto, by constructing a high strength support structure, and of improving the safety of the high temperature gas reactor remarkably by improving the heat resistance thereof.

BRIEF DESCRIPTION OF DRAWINGS

FIG. 6 shows a support plate used for the support member according to the first embodiment, wherein FIG. 6(a) is a front view thereof and FIG. 6(b) is a side view thereof.

FIG. 7 shows a support plate used for the support member according to the first embodiment, wherein FIG. 7(a) is a front view thereof and FIG. 7(b) is a side view thereof.

FIG. 8 shows a joining bolt used for the support member according to the first embodiment, wherein FIG. 8(a) is a front view thereof and FIG. 8(b) is a side view thereof.

FIG. 9 shows a nut used for the support member according to the first embodiment, wherein FIG. 9(a) is a front view thereof and FIG. 9(b) is a side view thereof.

FIG. 10 shows a joining belt used for the support member according to the first embodiment, wherein FIG. 10(a) is a front view thereof and FIG. 10(b) is a side view thereof.

FIG. 11 shows an inner cylinder used for the support member according to the first embodiment, wherein FIG. 11(a) is a front view thereof and FIG. 11(b) is a side view thereof.

FIG. 12 shows an outer cylinder used for the support member according to the first embodiment, wherein FIG. 12(a) is a front view thereof and FIG. 12(b) is a side view thereof.

FIG. 13 shows an upper lid used for the support member according to the first embodiment, wherein FIG. 13(a) is a plan view thereof and FIG. 13(b) is a cross-sectional view taken along line C-C in FIG. 13(a).

FIG. 14 shows a lower lid used for the support member according to the first embodiment, wherein FIG. 14(a) is a plan view thereof and FIG. 14(b) is a cross-sectional view taken along line D-D in FIG. 14(a).

DESCRIPTION OF EMBODIMENTS

First Embodiment

A first embodiment of the present invention will be described hereinbelow with reference to FIGS. 1 through 15.

Figure 1:
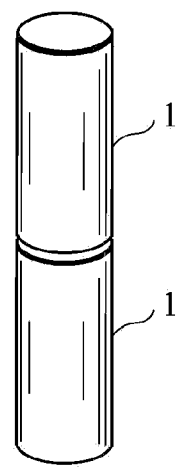
FIG. 1 is a perspective view illustrating a high-temperature gas reactor control rod of the present invention.
Figure 1:
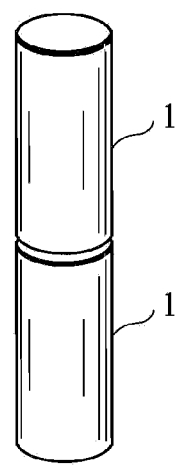
Figure 2:
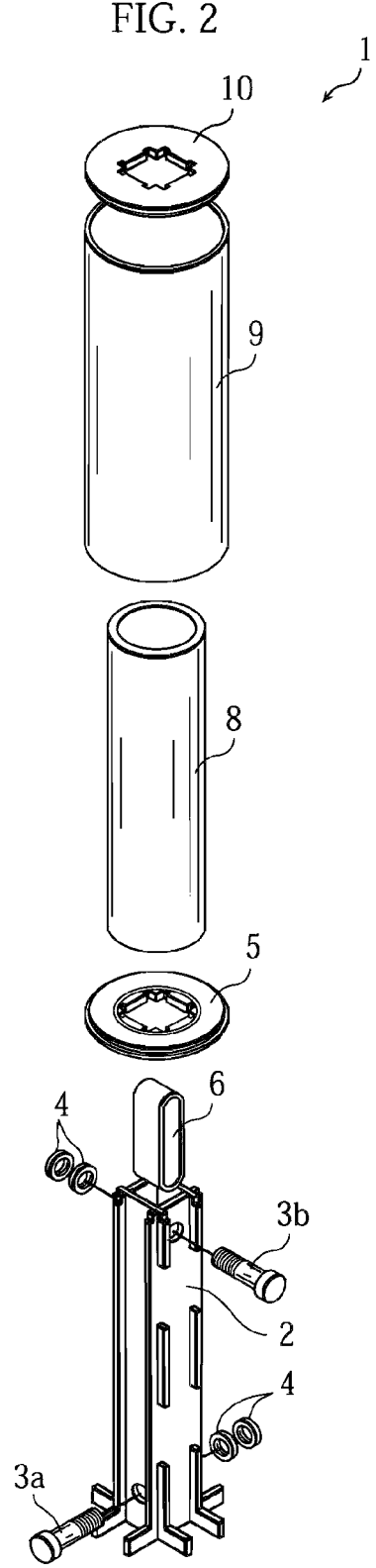
FIG. 2 is an exploded perspective view illustrating a control rod element according to a first embodiment.
Figure 3:
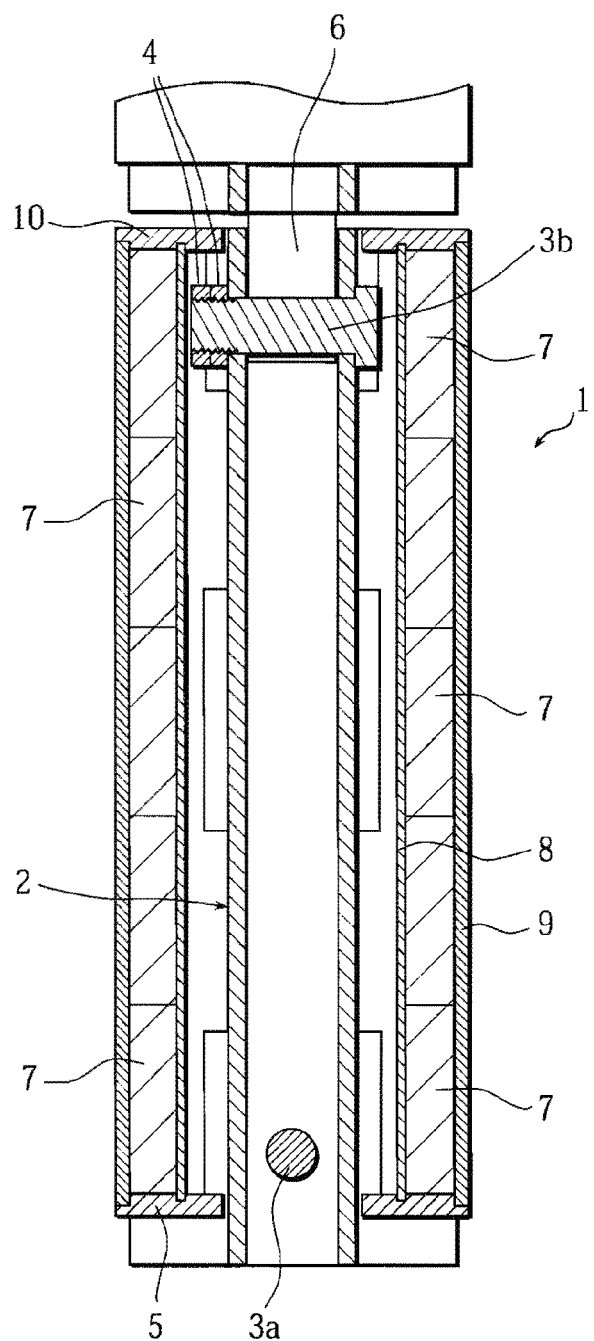
FIG. 3 is a cross-sectional view illustrating the control rod element according to the first embodiment.
Figure 4:
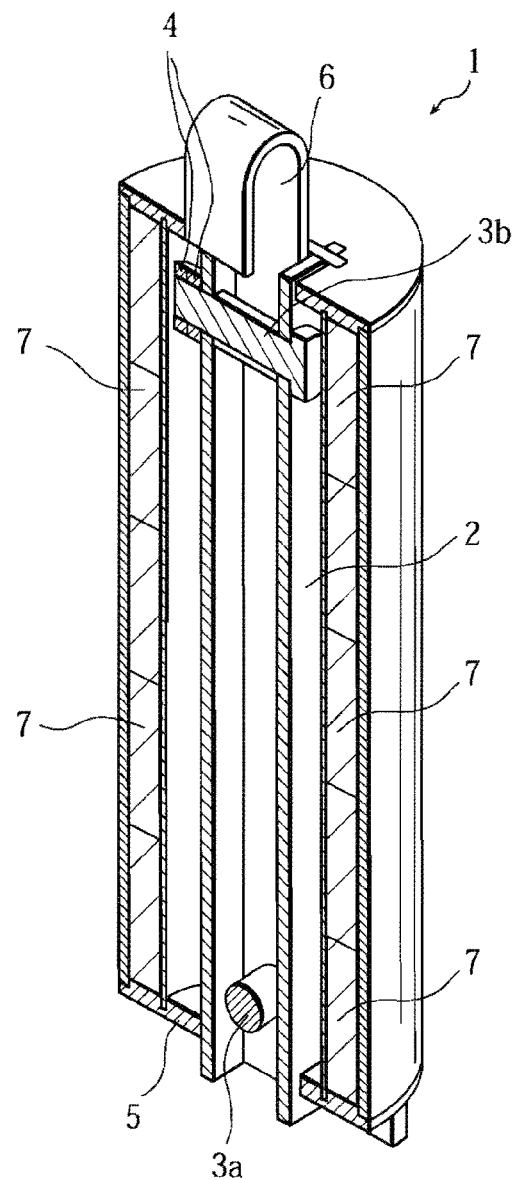
FIG. 4 is a cross-sectional perspective view illustrating the control rod element according to the first embodiment.

As illustrated in FIG. 1, a high-temperature gas reactor control rod of the present invention has a structure in which a plurality of control rod elements 1 are joined to each other in a vertical direction (up/down direction). A slight gap is provided between the control rod elements 1. The gap is provided between the control rod elements 1 because, in that way, joining bolts 3a and 3b can move upward and downward within a later-described joining belt 6 when stress is applied to the control rod element 1 in an up/down direction, so that the control rod element 1 can be prevented from damage. As illustrated in FIGS. 2 to 4 (note that the neutron absorber 7 is not shown in FIG. 2), the control rod element 1 has an outer cylinder 9, an inner cylinder 8, neutron absorbers 7 disposed between the cylinders 8 and 9, a columnar support member 2 disposed in the inner cylinder 8, a lower lid 5, disposed at the lower ends of the cylinders 8 and 9, for supporting the neutron absorbers 7 at the bottom, and an upper lid 10 disposed at the upper ends of the cylinders 8 and 9.

Figure 5:
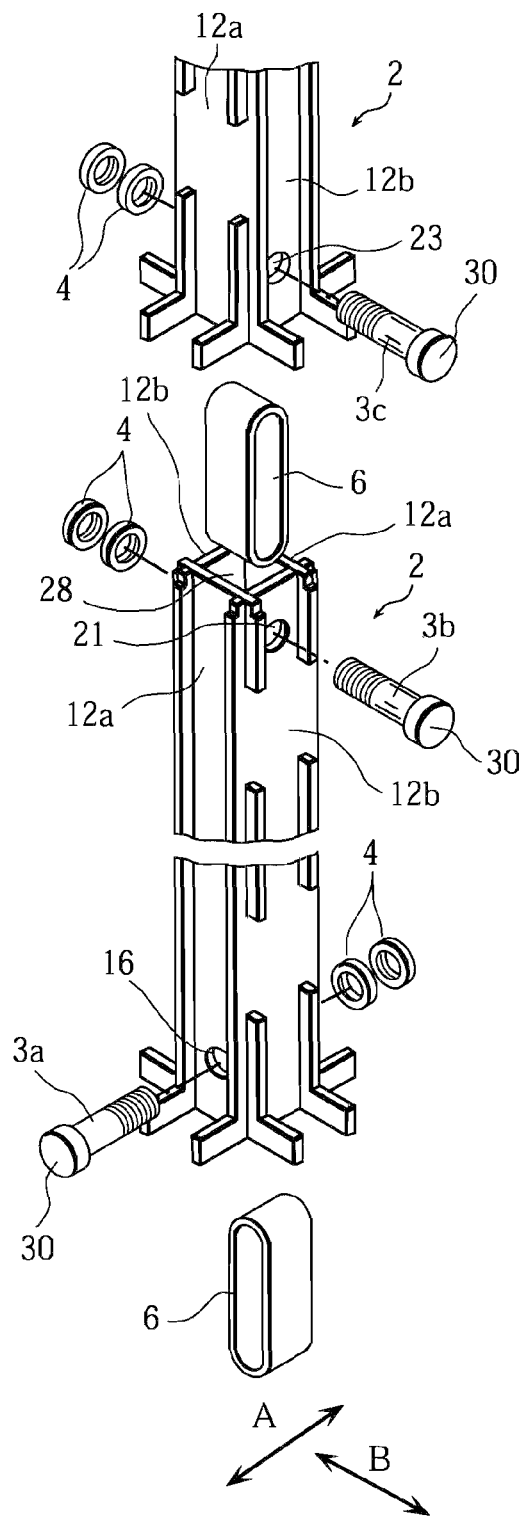
FIG. 5 is an exploded perspective view illustrating the joining state of support members according to the first embodiment.
Figure 6:
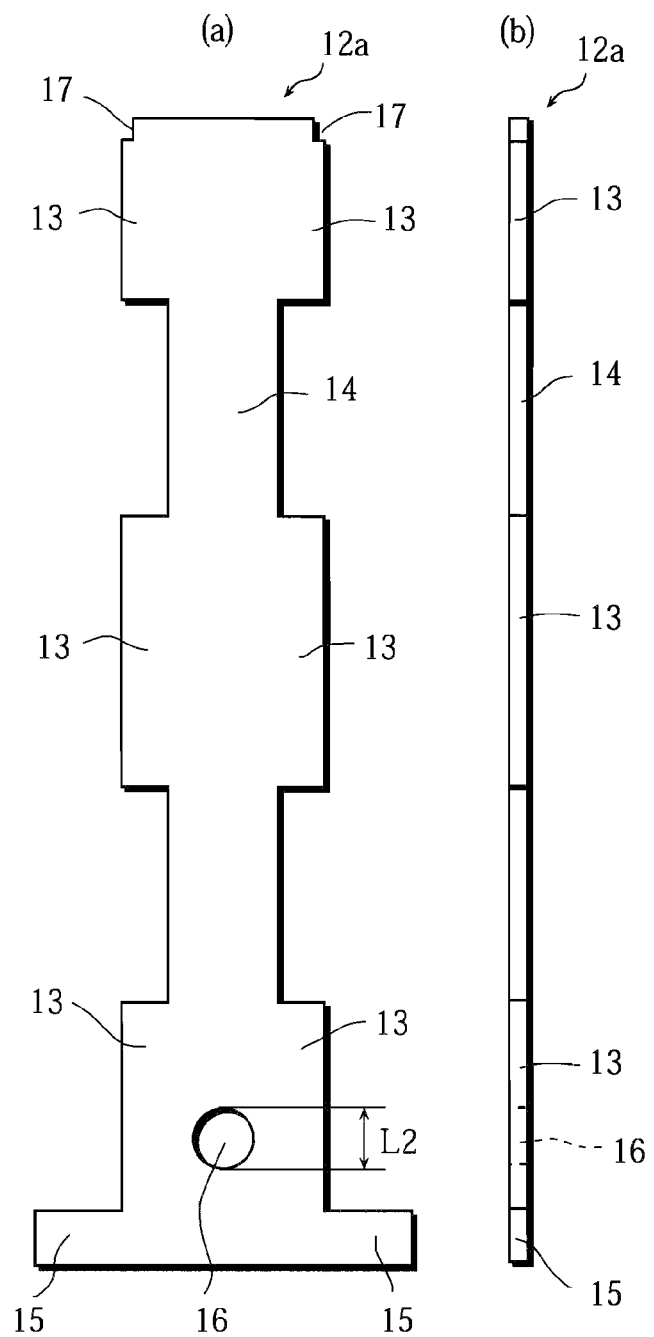

As illustrated in FIG. 5, the support member 2 has a substantially quadrangular cross-sectional shape, and it is constructed by combining two flat plate-shaped support plates 12a (side walls) made of a C/C composite material and two flat plate-shaped support plate 12b (side walls) made of a C/C composite material. When the support plates 12a and 12b are in a flat plate shape, it becomes easy to prepare the components constituting the support member 2, and when the support plates 12a and 12b are made of a C/C composite material, improvements in heat resistance and mechanical strength can be achieved. Furthermore, when the four support plates 12a and 12b are combined, a hollow portion 28 can be formed at the center of the support member 2 and the weight of the support member 2 can be reduced, so that the weight applied to a later-described joining means can be reduced.

The detailed structure of the support plate 12a is as follows. As illustrated in FIGS. 6(a) and 6(b), flanges 13 to be fitted into the slits of the later-described support plate 12b are formed at side portions of a main portion 14 integrally with the main portion 14. In addition, at lower end positions of the support plate 12a, lower lid supporting flanges 15 extending toward the inner cylinder 8 are formed integrally with the flanges 13 (and also with the main portion 14), to form a structure in which the lower lid 5 is placed on the lower lid supporting flanges 15. The lower lid supporting flanges 15 extend toward the inner cylinder 8 and have the function of neutron absorbing material supporting flanges that bear the load of the neutron absorbing materials through the lower lid 5. With such a structure, the load of the neutron absorbers 7 applied through the lower lid 5 is applied in a plane direction of the support plate 12a, so the load of the neutron absorbers 7 can be dispersed. Therefore, the support member 2 can be prevented from damage. Moreover, since the load is applied in a plane direction of the support plate 12*a*, a structure utilizing the high shear strength of the C/C composite is formed.

Figure 8:
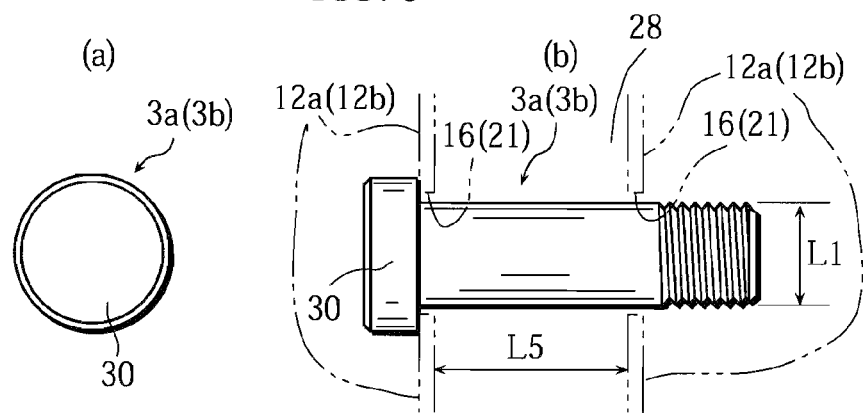
Figure 9:
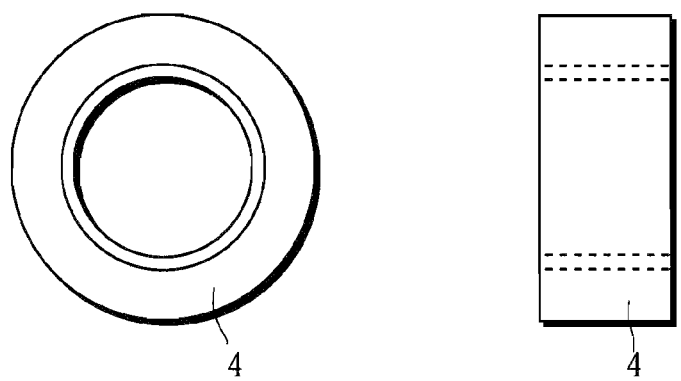

A hole 16 is formed near the lower end of the support plate 12*a*, to form a structure in which a bolt 3*a* (shaft), shown in FIG. 8, is inserted through the hole 16 and the ring-shaped joining belt 6 disposed in the support member 2 in a horizontal direction. The bolt 3*a* is secured to the support member 2 by a nut 4, shown in FIG. 9. For the same reason as described above (the reason that the strength and the like are taken into consideration), the joining belt 6, the bolt 3*a*, and the nut 4 are made of a C/C composite material. The joining belt 6 has a plate-like shape, whereby the low weight and high strength of the joining belt 6 are achieved. In addition, notches 17 for placing the upper lid 10 thereon are formed at upper end positions of the support plate 12*a*.

Figure 7:
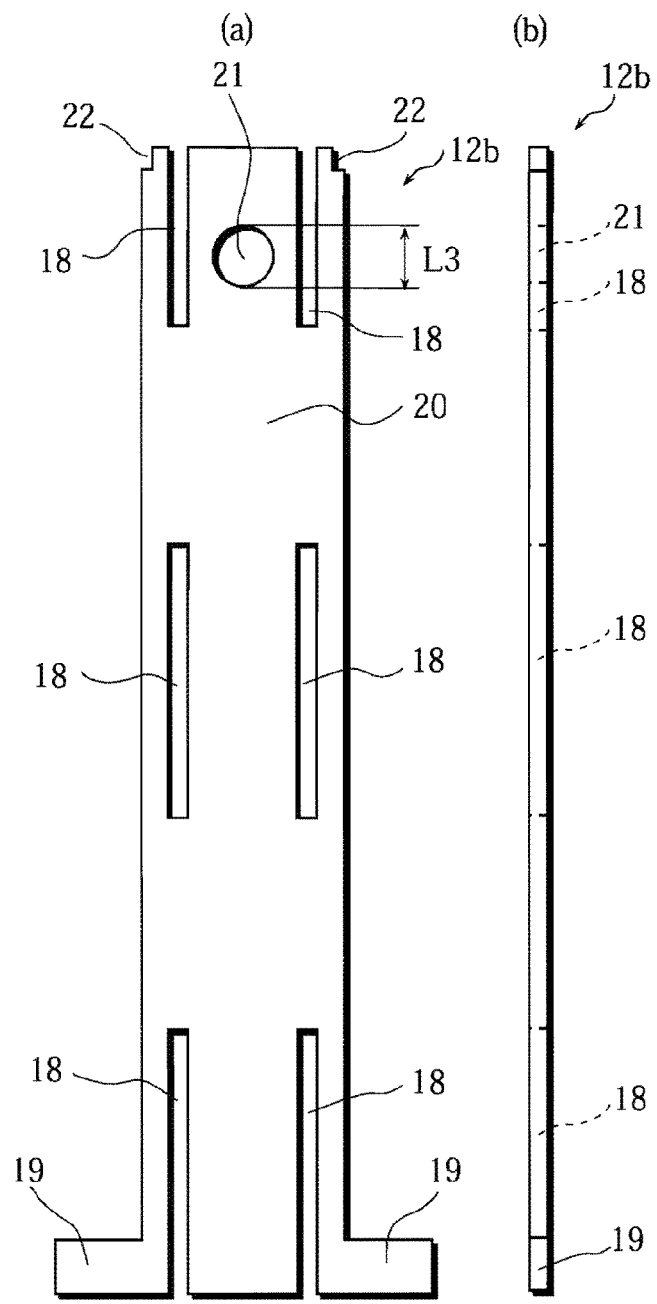

On the other hand, the detailed structure of the support plate 12*b* is as follows. As illustrated in FIGS. 7(*a*) and 7(*b*), slits 18 in which the flanges 13 of the support plate 12*a* are fitted are formed in a main portion 20. Each of the slits 18 is a vertically long opening. Thereby, the contact area of the support plates is large, and the load is applied in a plane direction on both the support plates 12*a* and 12*b*, so that the high shear strength of the C/C composite can be utilized. In addition, at lower end positions of the support plate 12*a*, lower lid supporting flanges 19 extending toward the inner cylinder 8 are formed integrally with the main portion 20, to form a structure in which the lower lid 5 is placed on the lower lid supporting flanges 19. With such a structure, the load of the neutron absorbers 7 applied through the lower lid 5 is applied in a plane direction of the support plate 12*b* as in a similar manner to the above, so the load of the neutron absorbers 7 can be dispersed. Therefore, the support member 2 can be prevented from damage. Furthermore, since the load is applied in a plane direction of the support plate 12*a*, a structure utilizing the high shear strength of the C/C composite is formed.

The support plates 12*a* and 12*b* may be merely combined with each other if it is possible to obtain a sufficient strength by merely combining them together. It is also possible to increase the joining strength using a carbonaceous adhesive agent.

A hole 21 is formed near the upper end of the support plate 12*b*, to form a structure in which a bolt 3*b* (shaft), shown in FIG. 8, is inserted through the hole 21 and the ring-shaped joining belt 6 (shown in FIG. 10) disposed in the support member 2 in a horizontal direction. The bolt 3*b* is secured to the support member 2 by a nut 4, shown in FIG. 9. For the same reason as described above (the reason that the strength and the like are taken into consideration), the bolt 3*b* is made of a C/C composite material. In addition, notches 22 for fitting the upper lid 10 thereto are formed at upper end positions of the support plate 12*a*. The upper lid 10 may be bonded to the support plates 12*a* and 12*b* using a carbonaceous adhesive agent. The support plates 12*a* and 12*b* have a tensile strength of about 250 MPa. When the minimum cross-sectional area in which the bolt 3*b* passes through is 1.35 cm$^2$, it is possible to hang a static load of 33.7 kN.

The joining belt 6, the bolt 3*a* (or 3*b*), and the nuts 4 constitute the joining means. A low cost and highly reliable joining means can be provided because the strong joining means can be constructed with such a small number of components. In the case that the width of the joining belt 6 (L6 in FIG. 10(*b*)) is 28 mm and the thickness thereof (L7 in FIG. 10(*a*)) is 3 mm, it is possible to hang a static load of 19.6 kN. Therefore, the tensile strength is improved remarkably. When the diameter of the bolt 3*a* (or 3*b*) (L1 in FIG. 8(*b*)) is 18 mm, the shear strength is 19.2 kN, so the shear strength is remarkably improved.

In addition, the diameter of the holes 16 and 21 (L2 in FIG. 6 and L3 in FIG. 7) is configured to be slightly larger than the diameter of the bolts 3*a* and 3*b* (L1 in FIG. 8(*b*)). This allows the bolt 3*a* (or 3*b*) to pass through the holes easily. Moreover, the bolt 3*a* (or 3*b*) can slightly move within the holes 16 and 21 because the bolt 3*a* (or 3*b*) is inserted through the holes 16 and 21 with a slight clearance, and as a result, when external stress is applied thereto, the stress can be alleviated (in other words, the components that constitute the support member 2, such as the bolt 3*a* (or 3*b*) and the joining belt 6, can be prevented from breaking). Furthermore, the joining belt 6 is configured so that the internal hollow portion width (L4 in FIG. 10(*a*)) along a direction perpendicular to the axis of the bolt 3*a* (or 3*b*) is larger than the diameter of the bolt 3*a* (or 3*b*) (L1 in FIG. 8(*b*)). This configuration can also alleviate external stress for the same reason as described above.

Figure 10:
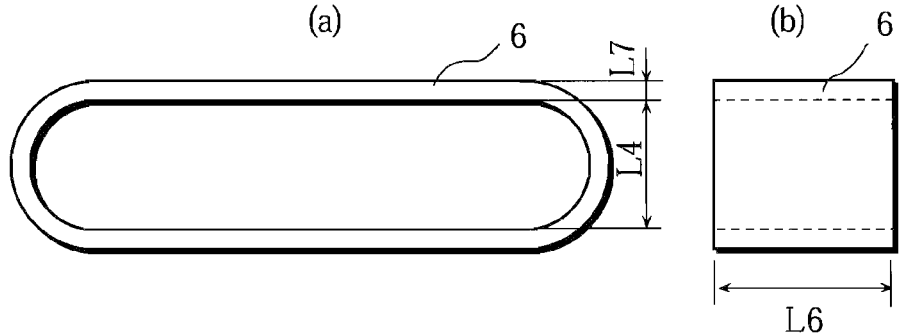

In addition, the width of the joining belt 6 (L6 in FIG. 10(*b*)) is configured to be smaller than the axial length of the bolt 3*a* (or 3*b*) (L5 in FIG. 8(*b*)) within the hollow portion 28. As a result, the joining belt 6 can move along an axial direction of the shaft, so that the external stress can be alleviated.

Moreover, the bolt 3*a* and the bolt 3*b* are disposed in a twisted state (in a state in which their axes are at right angles to each other), and therefore, the two joining belts (i.e., referring to FIG. 5, the joining belt 6 disposed at an upper portion of the support member 2 and the joining belt 6 disposed at a lower portion of the support member 2) can move in different directions. As a result, stress can be alleviated even when stress is applied in a direction perpendicular to the axis of the control rod element 1 (e.g., in directions A or directions B in FIG. 5).

In FIG. 5, a bolt 3*c* is disposed at a position near the lower end of the support plate 12*a*, while the bolt 3*b* is disposed at a position near the upper end of the support plate 12*a*. This structure allows the length of the joining belt 6 to be short, so the size of the joining belt can be made small.

Furthermore, the bolts 3*a*, 3*b*, and 3*c* have such a length that, even when the nuts 4 come off from the bolts 3*a*, 3*b*, and 3*c* and the bolts are displaced toward one side within the inner cylinder 8 due to, for example, deterioration over time or shocks, the heads 30 of the bolts 3*a*, 3*b*, and 3*c* will not come into contact with the inner surface of the inner cylinder 8 so that the bolts can be prevented from coming off from the two holes 16 (or 21 or 23), which are in a inserted state. Thus, even when the nuts 4 come off, the bolt 3*a*, 3*b*, and 3*c* are prevented from coming off and consequently the control rod element 1 can be prevented from falling off.

(Description of Other Components)

Figure 11:
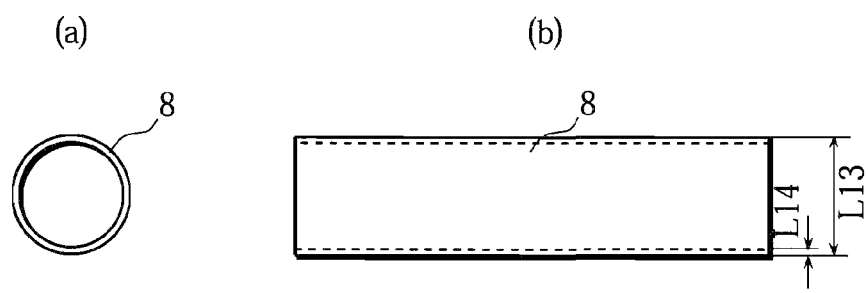
Figure 12:
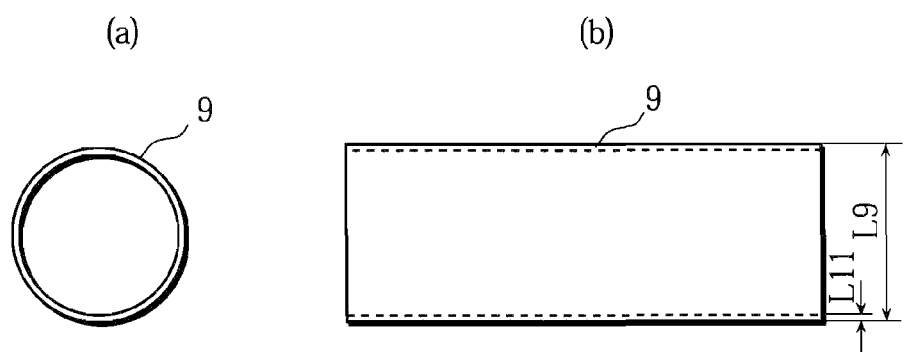

As illustrated in FIGS. 11(*a*) and 11(*b*), the inner cylinder 8 has a cylindrical shape, and it is made of a C/C composite material. As illustrated in FIGS. 12(*a*) and 12(*b*), the outer cylinder 9 has a cylindrical shape having a larger diameter than the inner cylinder 8, and it is made of a C/C composite material.

Figure 13:
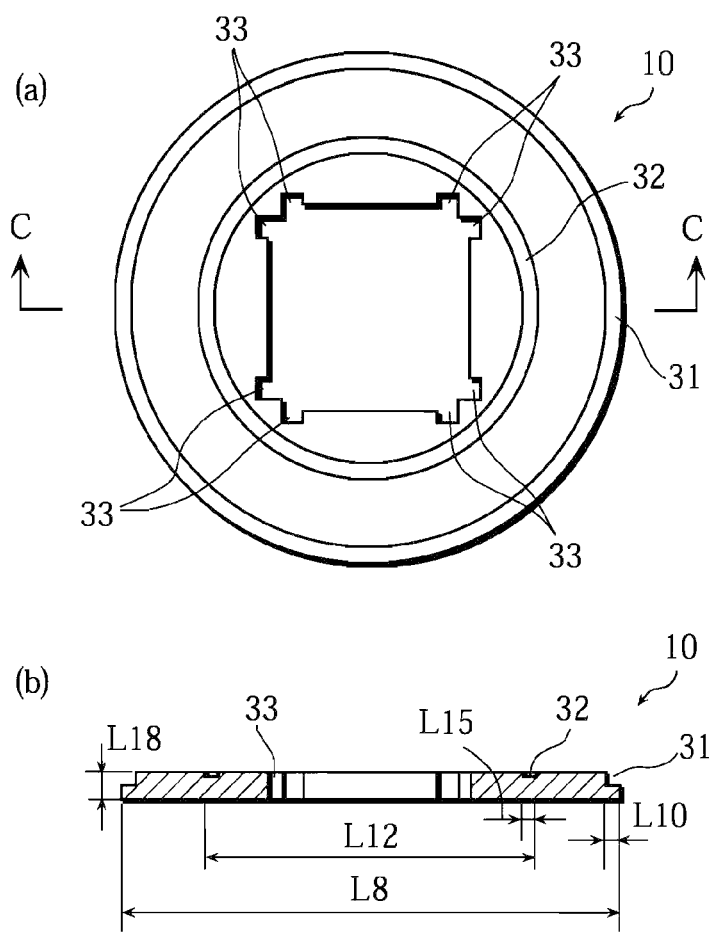
Figure 14:
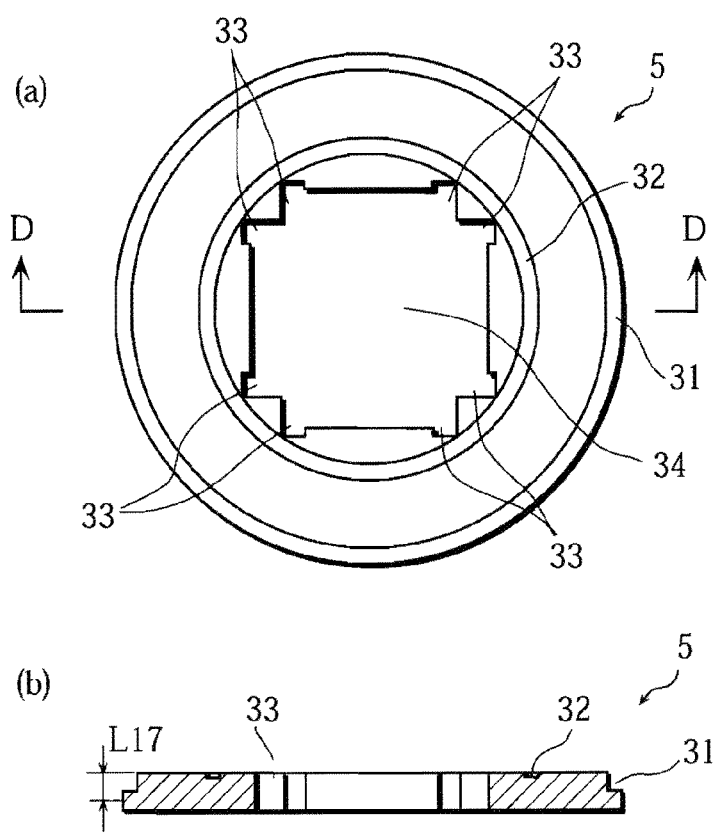

As illustrated in FIGS. 13(*a*) and 13(*b*), the upper lid 10 has a disk shape, and the outer diameter thereof (L8 in FIG. 13(*b*)) is configured to be the same as the outer diameter of the outer cylinder 9 (L9 in FIG. 12(*b*)). A notch 31 is formed in the outermost periphery of the upper lid 10, and the width of the notch 31 (L10 in FIG. 13(*b*)) is configured to be the same as the thickness of the outer cylinder 9 (L11 in FIG. 12(*b*)). In addition, a groove 32 is formed inward of the notch 31. The outer diameter of the groove 32 (L12 in FIG. 13(*b*)) is configured to be the same as the outer diameter of the inner cylinder 8 (L13 in FIG. 11(b)), and the width of the groove 32 (L15 in FIG. 13(b)) is configured to be the same as the thickness of the inner cylinder 8 (L14 in FIG. 11(b)). Furthermore, grooves 33 in which end portions of the support plates 12a and 12b are to be fitted are formed inward of the groove 32. With such a structure, the upper lid 10 can be fitted at a position above the inner cylinder 8, the outer cylinder 9, and the support member 10.

As illustrated in FIGS. 14(a) and 14(b), the lower lid 5 has a disk shape. The lower lid 5 has substantially the same structure as that of the upper lid 10 (i.e., a notch 35, a groove 32, and a groove 33 are formed at the same locations). With such a structure, the lower lid 5 can be fitted at a position below the inner cylinder 8, the outer cylinder 9, and the support member 10. However, what is different is that an internal space shape 34 is slightly different, and that the thickness of the lower lid 5 (L17 in FIG. 14(b)) is slightly greater than the thickness of the upper lid 10 (L18 in FIG. 13(b)) in order to support the neutron absorbers 7 at a lower location. It should be noted that the safety of the nuclear reactor is improved by employing a structure in which the neutron absorbers 7 are supported by the disk-shaped lower lid 5 (i.e., not supported by a screw thread) in this way.

The inner cylinder 8 and the outer cylinder 9 are the components only for accommodating the neutron absorbers 7, so the thicknesses of the cylinders 8 and 9 (L14 in FIG. 11(b) and L11 in FIG. 12(b)) may be made small. Also, the upper lid 10 is used only for sealing the control rod elements, and therefore, the thickness of the upper lid 10 (L18 in FIG. 13(b)) may be configured to be small. Furthermore, although the lower lid 5 has a slightly larger thickness than the upper lid 10, the thickness of the lower lid 5 (L17 in FIG. 14(b)) need not be made so great because only the regions sandwiched by the neutron absorbers 7 and the lower lid flanges 15 and 19 receive the load. By employing the structure as described above, the material cost of the high-temperature gas reactor control rod can be reduced.

(Modified Examples of the First Embodiment)

(1) Of the components that constitute the control rod element 1, the components other than the neutron absorbers 7 are made of a C/C composite material in the above-described example. However, it is possible that all the components other than the neutron absorbers 7 may be made of a SiC/SiC composite material. It is also possible that only the primary components (such as the bolts 3a, 3b, and 3c, and the joining belt) may be made of a SiC/SiC composite material. It is also possible that only the primary components (such as the bolts 3a, 3b, and 3c, and the joining belt) may be made of a SiC/SiC composite material and the other components may be made of an ordinary carbon material.

Figure 15:
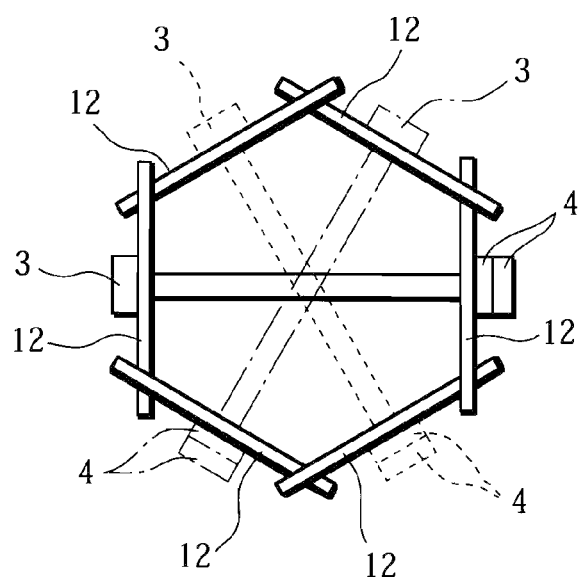
FIG. 15 is an illustrative view showing a modified example of the support member according to the first embodiment.

(2) The shape of the support member is not limited to a quadrangular cross-sectional shape. It is of course possible to employ a regular hexagonal cross-sectional shape as shown in FIG. 15, or a regular octagonal cross-sectional shape, for example. It should be noted that when employing a regular hexagonal cross-sectional shape as shown in FIG. 15, the bolts 3 should be disposed so that the axes of the bolts 3 are at 60 degrees to each other.

(3) The bolts 3a, 3b, and 3c and the joining belt 6 of the control rod element 1 disposed in an upper portion of the control rod are placed under a greater load than the bolts 3a, 3b, and 3c and the joining belt 6 the control rod element 1 disposed in a lower portion of the control rod. For this reason, it is possible that the bolts 3a, 3b, and 3c of the control rod element 1 disposed in an upper portion of the control rod may have a larger diameter than the bolts 3a, 3b, and 3c of the control rod element 1 that are disposed at a lower portion, or that the joining belt 6 of the control rod element 1 that is disposed at an upper portion may have a greater thickness than the joining belt 6 of the control rod element 1 disposed in a lower portion of the control rod. It is also possible that the bolts 3a, 3b, and 3c and the joining belt 6 of the control rod element 1 disposed in an upper portion of the control rod may be made of a SiC/SiC composite material while the bolts 3a, 3b, and 3c and the joining belt 6 of the control rod element 1 disposed in a lower portion of the control rod may be made of a C/C composite material.

Second Embodiment

A second embodiment of the present invention will be described hereinbelow with reference to FIGS. 16 through 18.

Figure 16:
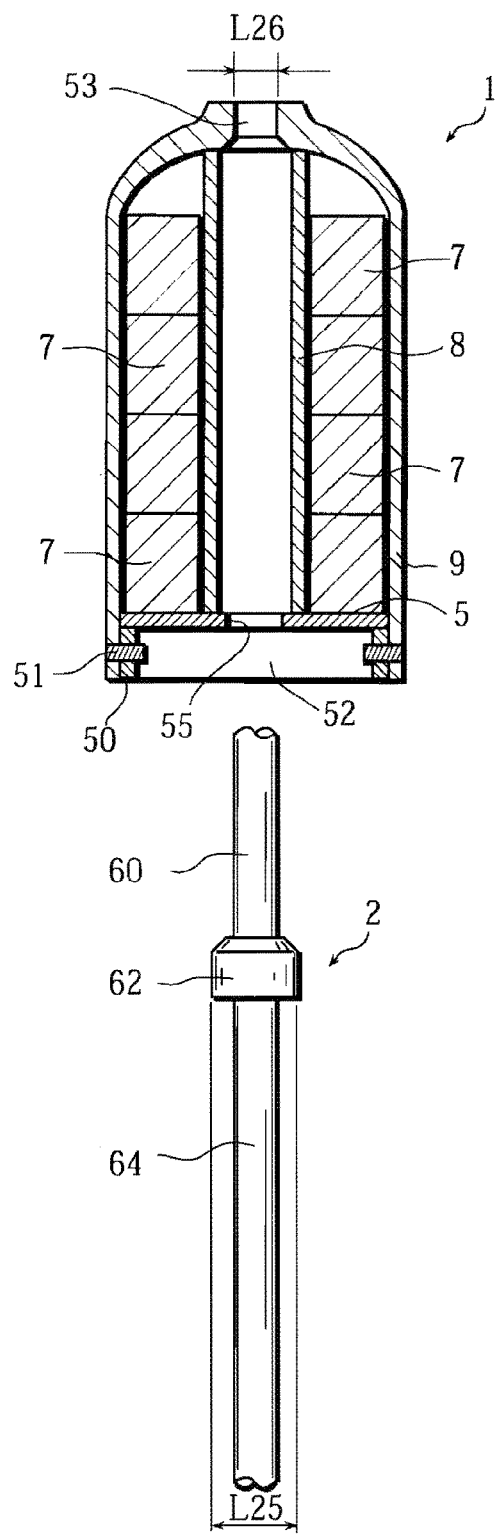
FIG. 16 is an illustrative view showing a control rod element according to a second embodiment.
Figure 17:
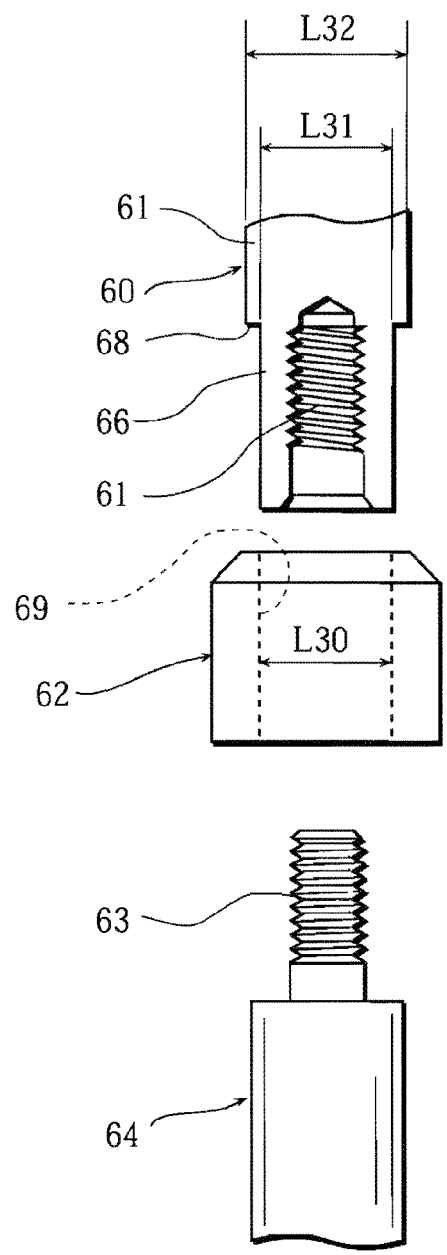
FIG. 17 is an exploded side view illustrating the support member according to the second embodiment.

As illustrated in FIG. 16, a control rod element 1 according to the second embodiment has an outer cylinder 9, an inner cylinder 8, neutron absorbers 7 disposed between the cylinders 8 and 9, a cylindrical columnar support member 2 disposed in the inner cylinder 8, a lower lid 5, disposed at the lower ends of the cylinders 8 and 9, for supporting the neutron absorbers 7 at the bottom, and a support ring 50, and securing screws 51.

The outer cylinder 9 has a bell-like shape tapered toward the top, and it has a structure in which the neutron absorbers 7 and the inner cylinder 8 are inserted from a lower opening 52. In the upper end of the outer cylinder 9, a through hole 53 is provided for passing the columnar support member 2 therethrough. In addition, at the center of the disk-shaped lower lid 5 disposed at the lower end of the inner cylinder 8, a through hole 55 is provided for passing the support member 2 therethrough. The outer diameter of the lower lid 5 (L21 in FIG. 18) is substantially the same as the inner diameter of the outer cylinder 9 (L20 in FIG. 18). In addition, the support ring 50 is disposed below the lower lid 5. The outer diameter of the support ring 50 (L22 in FIG. 18) is substantially the same as the inner diameter of the outer cylinder 9 (L20 in FIG. 18).

In the outer cylinder 9 and the support ring 50, holes 56 and 57 are respectively formed at the positions that match each other when the support ring 50 is positioned in the outer cylinder 9. A plurality of (about 10 in the present embodiment) screws 51 made of, for example, a 2D-C/C composite are screw-fitted to the holes 56 and 57. Thereby, the support ring 50 is secured to the outer cylinder 9. The screws 51 are provided so as not to protrude from the outer surface of the outer cylinder 9. The length of the inner cylinder 8 is set at such a length that the upper end thereof is almost in contact with the upper inner surface of the outer cylinder 9, to form such a structure that a large number of neutron absorbers 7 can be disposed between the cylinders 8 and 9.

In the above-described structure, the load of the inner cylinder 8 and the neutron absorbers 7 is received by the lower lid 5, and the lower lid 5 is supported from below by the support ring 50. The support ring 50 has a width along an up/down direction, and it is screw-fastened from horizontal directions. Thus, the load from the lower lid 5 is applied to the support ring 50 in a plane direction thereof and further to a plurality of screw-fastened portions, so that the load bearing performance is increased.

The support member 2 is inserted in the inner cylinder 8. The support member 2 is provided with a bulging portion 62. The outer diameter of the bulging portion 62 (L25 in FIG. 16) is set larger than the hole diameter of the through hole 53 (L26 FIG. 16) provided at the upper end of the outer cylinder 9. Thus, the bulging portion 62 is caught by the through hole 53 so that the control rod element 1 can be supported by the support member 2 via the bulging portion 62. The upper end of the bulging portion 62 and the lower edge of the through hole 53 of the outer cylinder 9 are in a tapered shape, to form such a structure that, by bringing these portions into contact with each other, swaying of the outer cylinder 9 can be lessened.

The detailed structure of the support member 2 is as follows. As illustrated in FIG. 17, it has an upper supporting member 60, the bulging portion 62, and a lower supporting member 64. The lower supporting member 64 has a thread portion 63, while the upper supporting member 60 has a threaded hole 61. At the lower end of the upper supporting member 60, a smaller diameter portion 66 having a smaller diameter than the other portion is provided. A step portion 68 is formed at the boundary between the smaller diameter portion 66 and a larger diameter portion 67 (the other portion). A fitting hole 69 is provided in the bulging portion 62. The diameter of the fitting hole 69 (L30 in FIG. 17) is set larger than the diameter of the smaller diameter portion 66 (L31 in FIG. 17) of the smaller diameter portion 66 but is set smaller than the diameter of the larger diameter portion 67 (L32 in FIG. 17). Thus, when the smaller diameter portion 66 of the upper supporting member 60 is inserted into the fitting hole 69 of the bulging portion 62 from below the upper supporting member 60, the upper end of the bulging portion 62 is caught by the step portion 68. When the thread portion 63 of the lower supporting member 64 is screw-fitted to the threaded hole 61 of the upper supporting member 60 under this condition, the bulging portion 62 is sandwiched and fixed between the upper supporting member 60 and the lower supporting member 64.

Here, when a plurality of control rod elements 1 are joined to each other, a threaded hole (not shown) should be formed at the lower end of the lower supporting member 64 so that the support column of another control rod element (not shown), which is provided with the bulging portion and the thread portion, can be attached from below. In the case that a thread portion and a threaded hole are provided, it is also possible to employ a structure in which the upper supporting member 60 has the thread portion while the lower supporting member 64 has the threaded hole.

This configuration achieves a structure in which the neutron absorbers 7 can be reliably accommodated in the outer cylinder 9 with a small parts count and with a simple configuration. In addition, the neutron absorbers 7 that have heavy weight can be supported stably by the support member 2.

It should be noted that when all the parts and components, including the outer cylinder 9, of the present embodiment are formed of a C/C composite material, weight reduction can be achieved while ensuring high strength. It is also possible to use a SiC/SiC composite in place of the C/C composite, to achieve still higher strength. Nevertheless, because the SiC/SiC composite is expensive, it is possible to use the SiC/SiC composite only for the bulging portion 62, the lower lid 5, the support ring 50, and the screws 51, for example, which require particularly high strength.

To integrally form the outer cylinder 9 with a shape tapered toward the top, it is preferable to use a filament winding method or a hand lay-up method. It is particularly preferable to use a filament winding method, with which even higher strength can be obtained. The filament winding method is as follows. Normally, a carbon fiber bundle, in which carbon fibers are bundled, is immersed in a low viscosity binder containing a thermosetting resin, a solvent, and the like, and thereafter, the carbon fiber bundle with the binder is wound around a mandrel in a crucible shape, to shape it into a required crucible shape. The winding of the carbon fiber bundle onto the mandrel may be conducted by any suitable method, for example, the method described in Japanese Unexamined Patent Publication No. 2003-201196, which is a patent application made by the present applicant. Thereafter, thermosetting is conducted at a temperature of from about 100° C. to about 300° C., for example, and the resultant molded product is carbonized in an inert gas such as a $N_2$ gas at a temperature of about 1000° C., for example. After this carbonization, a phenolic resin, tar pitch, or the like is impregnated therein as needed, and the resulting article is further heated at a temperature of 1500° C. or higher to perform carbonization (graphitization). The crucible obtained through the above-described process is heated, for example, in a halogen gas atmosphere at a temperature of from about 1500° C. to about 2500° C., and a refining process is performed, to form a C/C material. The hand lay-up method is as follows. A carbon fiber cloth is adhered to a crucible mold to prepare a molded product, and thereafter, thermosetting, carbonization, graphitization, and refining process are performed in a similar manner to the FW method, to obtain a C/C material.

Third Embodiment

A third embodiment will be described with reference to FIG. 19. The structures of the inner cylinder, the neutron absorbers, and the support member are the same as those in the second embodiment, and therefore, these components are not shown in FIG. 19.

Figure 19:
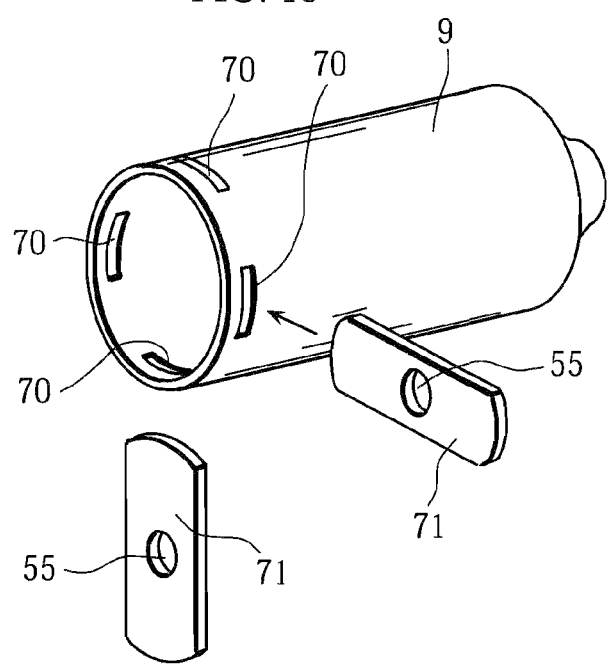
FIG. 19 is an exploded perspective view illustrating a control rod element according to a third embodiment.

As illustrated in FIG. 19, through holes 70 are formed intermittently along the circumferential direction slightly above the lower end of the outer cylinder. Flat plate-shaped support plates 71 are inserted in the through holes 70. Both ends of each of the support plates 71 are supported from below by the outer cylinder 9 that is below the through holes 70, whereby the neutron absorbers and the inner cylinder are supported from below by the support plates 71. A through hole 55 for inserting the support member 2 therethrough is provided near the lengthwise center of each of the support plates 71.

The number of the support plates 71 disposed using the through holes 70 is not limited to two, as described above, but may be one, or may be three or more, according to the strength required. The width of the through holes 70 may be set as appropriate. Moreover, the thickness of the support plate 71 may be set as appropriate according to the strength required.

This configuration makes it possible to support neutron absorbers with an extremely simple configuration, in which the through holes 70 are formed and the support plates 71 are inserted in the through holes 70. Moreover, the thickness, width, and the like of the support plates may be set according to the weight of the subject to be supported, such as the neutron absorber and the inner cylinder, so the strength setting can be made easily.

Figure 18:
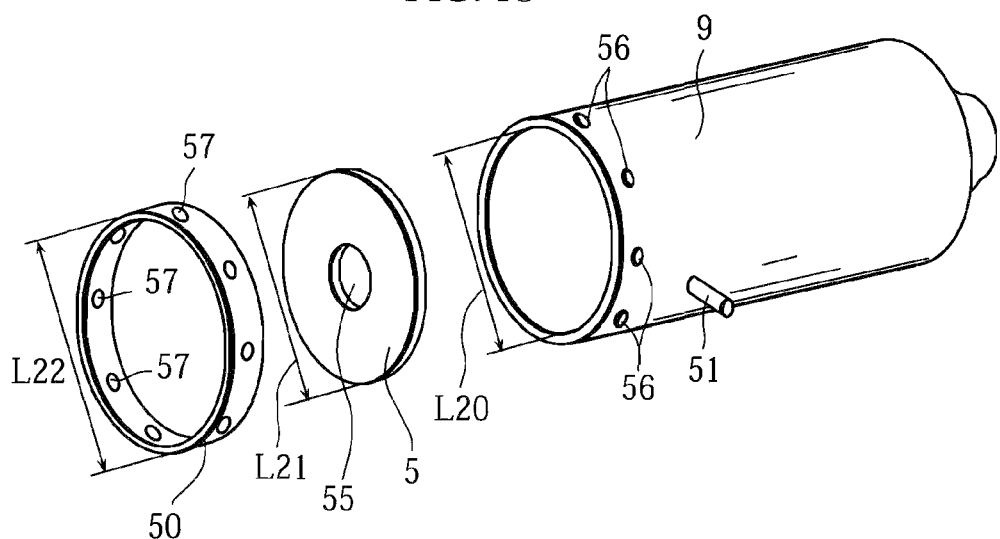
FIG. 18 is an exploded perspective view illustrating the control rod element according to the second embodiment.

The neutron absorbers may be directly placed on the support plates 71, or may be placed on the lower lid 5 as shown in FIG. 18, which may be disposed above the support plates 71. It is also possible to use, in combination, the configuration that uses the lower lid 5 and the support ring 50 as shown in FIGS. 16 and 18, to increase the support strength.

Furthermore, in the second embodiment and the third embodiment described above, it is also possible that, depending on the circumstances, a bolt or the like may be fitted to the location corresponding to the through hole 55, in the lower lid 5 or the support plate 71, for passing the support member, so that the control rod element can be connected to another control rod element using the bolt.

INDUSTRIAL APPLICABILITY

The present invention is applicable to a high temperature gas reactor for nuclear electric power generation.

The invention claimed is:

1. A high-temperature gas reactor control rod comprising:
    first and second control rod elements each having a neutron absorber between an outer cylinder and an inner cylinder that form a double cylindrical tubular shape along a longitudinal direction of each control rod element;
    first and second columnar support members respectively disposed in the inner cylinder of the first and second control rod elements, each of the first and second columnar support members axially extending in each control rod element in its entire length of the longitudinal direction to allow the first and second columnar support members to be vertically aligned and connected, thereby joining the first and second control rod elements in the longitudinal direction; and
    a joint structure provided to at least one of the first and second columnar support members and configured to connect a lower end of the first columnar support member and an upper end of the second columnar support member,
    wherein each of the first and second control rod elements has a neutron absorber supporting flange extending toward the inner cylinder, the neutron absorber supporting flange being formed on each support member, each support member supporting the load of the neutron absorber from below by the neutron absorber supporting flange,
    each support member has a side wall assembly and a hollow portion, the side wall assembly having a plurality of flat plates which define and form the hollow portion inside each support member, the hollow portion extending in the longitudinal direction,
    the plurality of flat plates are made of composite materials which are selected from the group consisting of C/C composite materials and SiC/SiC composite materials, and
    the joint structure comprises a shaft and a loop-shaped joining belt, the shaft being inserted through the loop-shaped joining belt and two holes formed in the side wall assembly in each of the first and second support members to connect the lower end of the first columnar support member and the upper end of the second columnar support member.

2. The high-temperature gas reactor control rod according to claim 1, wherein the joining belt forms a flat belt shape.

3. The high-temperature gas reactor control rod according to claim 1, wherein a gap is provided between the control rod elements.

4. The high-temperature gas reactor control rod according to claim 1, wherein the joint structure is provided respectively at both upper and lower ends of the first or second support member, the shaft provided at the upper end and the shaft provided at the lower end are disposed so as to extend in different directions in a planar view, and the width of the joining belt is configured to be smaller than the axial length of the shaft in the hollow portion.

5. The high-temperature gas reactor control rod according to claim 1, wherein the diameter of the shaft is smaller than the diameter of the two holes formed in the side wall assembly so as to form a clearance for alleviating stress.

6. The high-temperature gas reactor control rod according to claim 1, wherein an internal hollow portion width of the joining belt along a direction perpendicular to the axis of the shaft is larger than the diameter of the shaft so as to form a clearance for alleviating stress.

7. The high-temperature gas reactor control rod according to claim 1, wherein the joint structure comprises a first shaft, a second shaft, and a loop-shaped joining belt, the first shaft is inserted through the loop-shaped joining belt and holes formed at a position near the lower end of the side wall assembly of the first support member in the first control rod element, and the second shaft is inserted through the loop-shaped joining belt and holes formed at a position near the upper end of the side wall assembly of the second support member in the second control rod element.

8. The high-temperature gas reactor control rod according to claim 1, wherein a length of the shaft (E), a distance between outer ends of the two holes (D), and a space between each outer end of the two holes and an inner surface of the inner cylinder (S) meet the following relationship (1):

$$S+D \leq E \leq 2S+D \tag{1}.$$

9. The high-temperature gas reactor control rod according to claim 1, further comprising a neutron absorber supporting flange extending toward the inner cylinder, the neutron absorber supporting flange formed at the lower end of the first support member or in the vicinity thereof.

10. The high-temperature gas reactor control rod according to claim 1, wherein the support members have a polygonal cross-sectional shape, and the polygon is an even number polygon.

11. The high-temperature gas reactor control rod according to claim 10, wherein the support members in the polygonal cross-sectional shape are formed by combining flat plate-shaped parts made of a carbonaceous material with each other.

12. The high-temperature gas reactor control rod according to claim 11, wherein the neutron absorber supporting flange is integrally formed with the flat plate-shaped part made of a carbonaceous material by forming the neutron absorber supporting flange together with the flat plate-shaped part as one solid piece, so as to protrude in the shape of a rectangular piece.

13. The high-temperature gas reactor control rod according to claim 1, wherein the neutron absorber supporting flange is integrally formed with the flat plate-shaped part made of either one of a C/C composite material and a SiC/SiC composite material by forming the neutron absorber supporting flange together with the flat plate-shaped part as one solid piece, so as to protrude in the shape of a rectangular piece.

14. The high-temperature gas reactor control rod according to claim 1, wherein the joint structure is configured to join the first and second control rod elements by bolt connection.

15. The high-temperature gas reactor control rod according to claim 11, wherein the neutron absorber supporting flange is integrally formed with the flat plate-shaped part made of a carbonaceous material by forming the neutron absorber supporting flange separately from the flat plate-shaped part as different pieces to join the neutron absorber supporting flange to the flat plate-shaped part, so as to protrude in a shape of a rectangular piece.

16. The high-temperature gas reactor control rod according to claim 1, wherein the neutron absorber supporting flange is integrally formed with the flat plate-shaped part made of either one of a C/C composite material and a SiC/SiC composite material by forming the neutron absorber supporting flange separately from the flat plate-shaped part as different pieces to join the neutron absorber supporting flange to the flat plate-shaped part, so as to protrude in a shape of a rectangular piece.

* * * * *